(12) United States Patent
Guo et al.

(10) Patent No.: US 7,022,023 B2
(45) Date of Patent: Apr. 4, 2006

(54) INTEGRATED DRIVELINE FLANGE TORSIONAL DAMPER

(76) Inventors: Don Guo, 6569 Crabapple, Troy, MI (US) 48098; Corey Wurtzbacher, 2061 Marlowe, Canton, MI (US) 48187; William Raymond Miller, Jr., 1517 Marywood Dr., Royal Oak, MI (US) 48067

( * ) Notice: Subject to any disclaimer, the term of this patent is extended or adjusted under 35 U.S.C. 154(b) by 71 days.

(21) Appl. No.: 10/135,042

(22) Filed: Apr. 30, 2002

(65) Prior Publication Data

US 2003/0203758 A1   Oct. 30, 2003

(51) Int. Cl.
*F16F 15/12* (2006.01)

(52) U.S. Cl. ...................... 464/180; 74/574.4
(58) Field of Classification Search ................ 464/89, 464/180–182, 147, 185, 150, 903, 902; 74/574, 74/574.4; 180/381
See application file for complete search history.

(56) References Cited

U.S. PATENT DOCUMENTS

| | | | |
|---|---|---|---|
| 1,984,413 A * | 12/1934 | Lee ............... | 188/2 R |
| 2,121,819 A | 6/1938 | Oles | |
| 2,878,689 A * | 3/1959 | Aebersold ............ | 74/574 |
| 4,077,233 A | 3/1978 | Hörnig et al. | |
| 4,114,472 A * | 9/1978 | Hornig et al. ......... | 74/574 |
| 4,406,640 A | 9/1983 | Franklin et al. | |
| 4,516,955 A | 5/1985 | Wörner et al. | |
| 4,660,436 A | 4/1987 | Davoust et al. | |
| 4,734,079 A | 3/1988 | Viets | |
| 4,825,718 A | 5/1989 | Seifert et al. | |
| 4,884,666 A | 12/1989 | Stahl | |
| 4,961,254 A | 10/1990 | Andrea et al. | |
| 5,117,704 A | 6/1992 | Kish et al. | |
| 5,168,774 A | 12/1992 | Andreä et al. | |
| 5,516,331 A | 5/1996 | Morr et al. | |
| 5,562,544 A | 10/1996 | Ochs et al. | |
| 5,666,862 A | 9/1997 | Eckel et al. | |
| 5,966,996 A * | 10/1999 | Hamaekers ............ | 74/574 |
| 6,068,555 A | 5/2000 | Andreä et al. | |
| 6,251,021 B1 | 6/2001 | Jacob | |
| 6,312,340 B1 | 11/2001 | Gassen et al. | |
| 6,623,364 B1 * | 9/2003 | Badolato et al. ...... | 464/127 |

FOREIGN PATENT DOCUMENTS

DE   4020540 A   1/1991

* cited by examiner

*Primary Examiner*—Kenneth Thompson

(57) ABSTRACT

An integrated axle flange and torsional damper component for use on a vehicle having a driveshaft is disclosed. The integrated component includes a structural axle flange for transmitting torque, a torsional damper and an elastic component positioned between the structural flange and torsional damper. The method of constructing the integrated axle flange and torsional damper component and assembling the component to a vehicle is also disclosed. The method includes attaching the integrated component to the vehicle's driveline and balancing the driveline after attachment of the integrated component.

17 Claims, 4 Drawing Sheets

INTEGRATED DRIVELINE FLANGE TORSIONAL DAMPER

BACKGROUND OF THE INVENTION

The invention relates to a torsional driveline damper for an internal combustion engine powered motor vehicle, and particularly to a torsional driveline damper that is integrated with a torque-transmitting axle component.

BACKGROUND OF THE INVENTION

The use of inertial torsional damping devices to minimize torsional vibrations in rotating shafts is well known, particularly in motor vehicle drivetrain rotating shafts. Typically, torsional dampers are a separate component attached to a vehicle's rotating shaft. It is known to either press-on or bolt the torsional damper to the shaft.

One known system is disclosed in U.S. Pat. No. 5,168,774 (Andrä et al.) Andräet al. teach a rotational body made of a deep-drawn sheet metal portion having an integral hollow cylindrical center portion. The body also includes a metallic shrink-on sleeve immovably affixed to the outer circumference of the center portion.

There are several disadvantages to this system. One disadvantage is that the rotational body is an additional component that must be added to the rotating shaft. In other words, it serves no purpose other than a vibrational damping device. Therefore, it requires additional assembly and takes up additional space along the driveline of the vehicle.

Another known system is disclosed in U.S. Pat. No. 4,884,666 (Stahl.) Stahl teaches a torsional damper for mounting between a first shaft and a second shaft. The housing of the torsional damper has a ring shaped sealed cavity and an annular inertia weight rotatably mounted in the cavity in an unattached, concentric and slidable relationship with the housing cavity. A clearance exists between the inertia weight and the housing completely surrounding the inertia weight. Either a viscous fluid or a type of bearing may occupy the clearance. The clearance functions as a medium to dampen torsional vibration and noise. The system also includes mounting means that limit longitudinal and lateral motion between the shafts.

A disadvantage of the systems described above is that the damper is typically mounted to the shaft after the driveline has been balanced, thus throwing off the balancing.

Yet another known system is disclosed in U.S. Pat. No. 6,312,340 B1 (Gassen et al.) Gassen et al. teach an integrated vibration absorber that is mounted within a hollow drive shaft.

Some disadvantages of all of these systems are that: 1) they contribute to an overall increase in the weight of the vehicle, thus resulting in less efficient fuel consumption; 2) they present additional difficulty in balancing the driveline; and 3) they require additional assembly.

SUMMARY OF THE INVENTION

The present invention resolves the problems outlined above by providing an integrated motor vehicle structural axle flange and torsional damper. The device can be used as a structural component to transmit torque while performing driveline torsional vibration damping.

The present invention resolves the problems outlined above by providing an integrated axle flange and torsional damper that eliminates the need for an additional component to be added to the vehicle. The design disclosed here performs two functions while eliminating the need for extra assembly and only taking up space for a single component. The vehicle is designed to include structural driveline flanges for transmitting torque. However, the vehicle is not necessarily designed to support a supplemental torsional damper. This design provides for a torsional damper to be added to the structural component resulting in maintaining a minimal vehicle weight and occupying less space along the vehicle's driveline.

Another advantage of the present invention is that the integrated axle flange and torsional damper are balanced and assembled to the vehicle prior to balancing the vehicle's driveline. This results in more effective balancing of the driveline.

Additional benefits and advantages of the present invention will become apparent to those skilled in the art to which the present invention relates from the subsequent description of the preferred embodiment and the appended claims, taken in conjunction with the accompanying drawings.

DESCRIPTION OF THE PREFERRED EMBODIMENTS

The following description of the preferred embodiment of the invention is not intended to limit the invention to this preferred embodiment, but rather to enable a person skilled in the art of driveline flanges and torsional dampers to make and use this invention.

Figure 1:
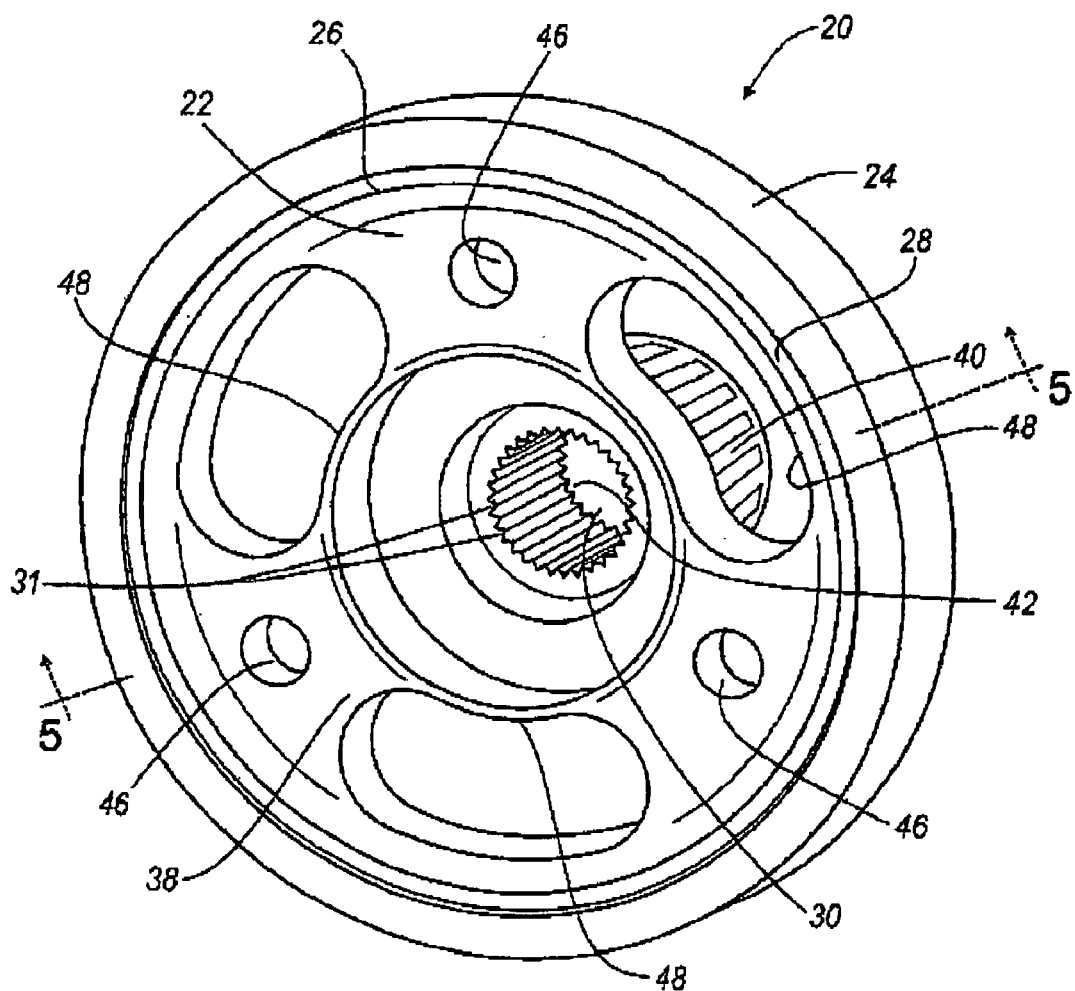
FIG. 1 is a perspective view of an embodiment of the present invention.

FIG. 1 illustrates the integrated driveline flange and torsional damper component, shown generally at 20. The integrated component 20 includes a structural driveline flange 22, an annular metallic torsional damper 24, and an elastic component 28 positioned between the structural flange 22 and damper 24. The elastic component 28 is preferably a rubber ring. The elastic component is attached to an outer periphery of the structural driveline flange 22. The torsional damper 24 is attached to an outer periphery of the elastic component 28. Further, the integrated component rotates in sync.

The torsional damper 24 is made from a metal material, preferably steel. The damper 24 is shown as a ring-shaped component in the figures. However, the size and shape of the damper 24 can be altered depending on the specifications for any particular vehicle driveline.

The structural driveline flange 22 is a component designed for transmitting driveline torque, preferably a rear axle flange. The rear axle flange 22 is preferably generally disc shaped having a central aperture 30 and an outer periphery 26. The flange has a first face 36 and a second face 38. The central aperture 30 extends through the flange 22 from the first face 36 to the second face 38.

Figure 2:
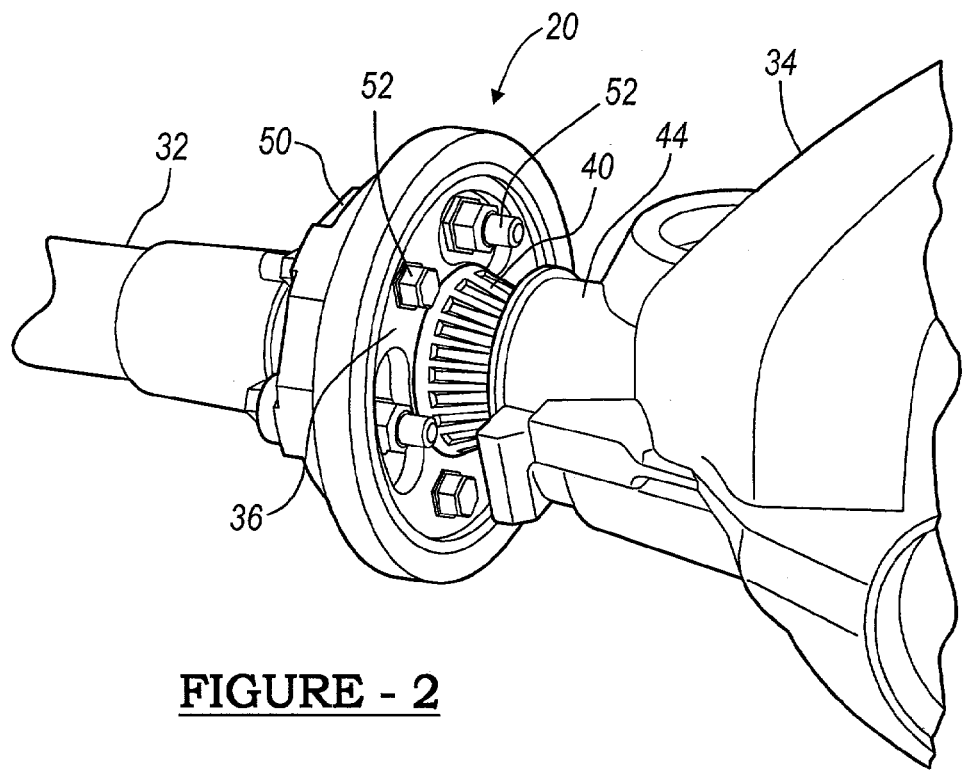
FIG. 2 is a perspective view of an embodiment of the present invention focused on the structural flange-damper component mounted to a driveshaft of a vehicle.

As shown in FIGS. 1 and 2, the flange 22 also includes an integral sleeve 40 that extends from the first face 36 of the flange 22 in the direction along a longitudinal axis through the central aperture 30 of the flange 22 away from the second face 38 of the flange 22. The sleeve 40 includes a central aperture 42 that is aligned with the central aperture 30 of the flange 22. The integrated central apertures 30, 42 of the flange 22 and the integral sleeve 42 are splined 31 for engagement with the input shaft 44 of the rear axle differential 34 is also splined for mating with the integrated central apertures 30, 42 of the flange 22 and sleeve 40.

The rear axle flange 22 also includes two other types of apertures 46, 48 positioned between the central aperture 30 and the outer periphery 26. Both types of apertures 46, 48 extend through the flange 22 longitudinally from the first face 36 to the second face 38. The first type of aperture 46 is generally circular-shaped. Preferably, there are three circular-shaped apertures 46. The second type of aperture 48 is generally oval-shaped. Preferably, there are three oval-shaped apertures 48. Further, the circular-shaped apertures 46 and oval-shaped apertures 48 are preferably positioned in an alternating pattern around the central aperture 30.

Figure 3:
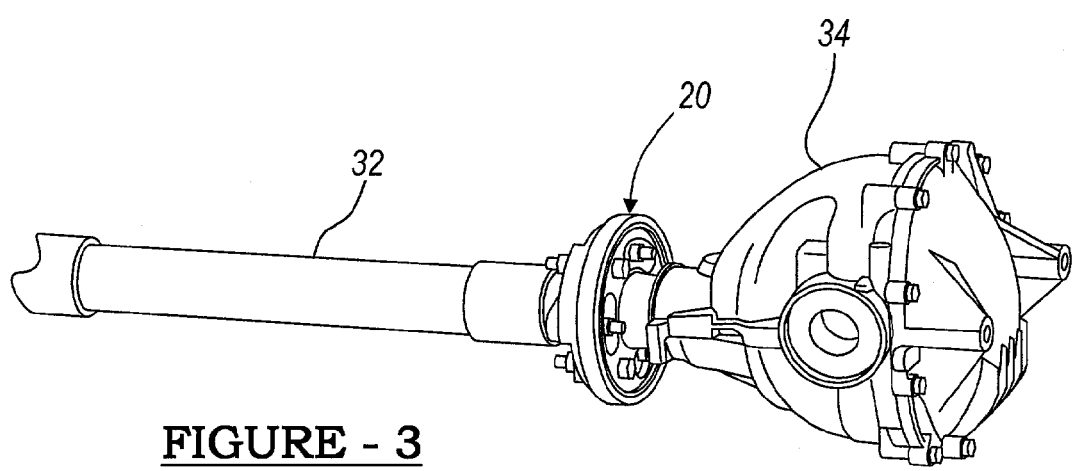
FIG. 3 is a perspective view of an embodiment of the present invention mounted to a drivesbaft of a vehicle.

As shown in FIGS. 2 and 3, the circular and oval shaped apertures 46, 48 allow the rear axle flange 22 to be attached to a second flanged structure 50 to form a type of universal joint. The second flanged structure 50 is positioned adjacent the second face 38 of the rear axle flange 22. Additionally, there are bearings positioned between the flanges contributing to the functionality of the universal joint, which are not seen in the Figures.

The universal joint formed by the rear axle flange 22 and the second flanged structure 50 is the connection between the vehicle's driveshaft 32 and the rear axle differential 34. In fact, the function of the universal joint is to transmit torque from the vehicle's driveline to the vehicle's rear axle, via the rear axle differential 34. The second flanged structure 50 is connected to the vehicle's driveshaft 32. The rear axle flange 22 is connected to the input shaft 44 of the rear axle differential 34.

The rear axle flange 22 and the second flanged structure 50 are preferably bolted together via the circular and oval shaped apertures 46, 48 in the rear axle flange 22 and corresponding apertures in the second flanged structure 50. The oval shaped apertures 48 provide clearance allowing for minimal relative motion between the rear axle flange 22 and the second flanged structure 50.

The bolts 52 extending through the circular shaped apertures 46 are arranged from the first face 36 of the rear axle flange 22 toward the second face 38 of the rear axle flange 22 and through the second flanged structure 50. Conversely, the bolts 52 extending through the oval shaped apertures 48 are arranged through the second flanged structure 50 and through the rear axle flange 22 from the second face 38 of the rear axle flange 22 toward the first face 36 of the rear axle flange 22.

Figure 4:
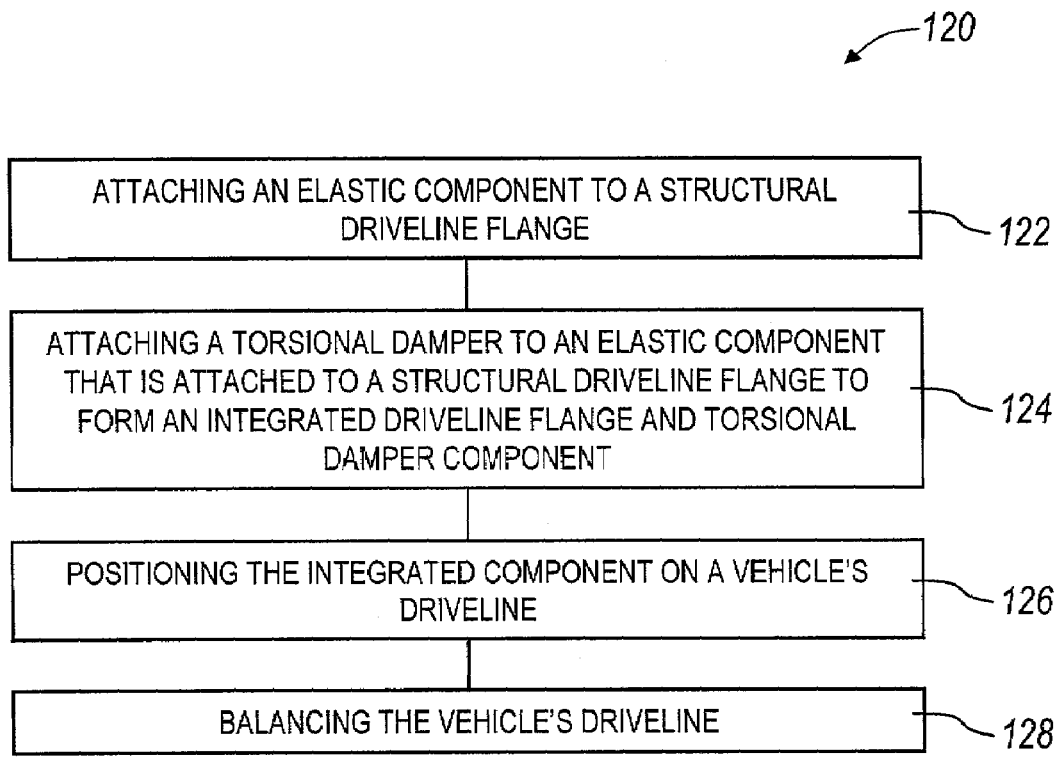
FIG. 4 is a flowchart illustrating the method of the present invention.
Figure 5:
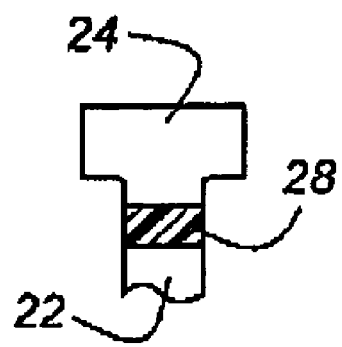
FIG. 5 is a cross section taken at plane 5 of FIG. 1.
Figure 5:
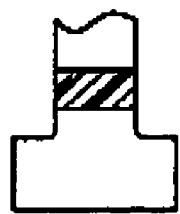

The method of assembling the integrated driveline flange and torsional damper to the vehicle is also disclosed. The flowchart illustrated in FIG. 4 outlines the method of constructing an integrated driveline flange and torsional damper component and assembling the component to a vehicle, shown generally at 120.

An elastic component is attached to a structural driveline flange at 122. Preferably, the elastic component is a rubber ring. A torsional damper is attached to an elastic component that is attached to a structural driveline flange to form an integrated driveline flange and torsional damper component at 124. The integrated component is positioned on a vehicle's drive shaft at 126. The vehicle's driveline is balanced at 128. Preferably, the structural driveline flange is a rear axle flange.

While the above description constitutes the preferred embodiment of the present invention, it will be appreciated that the invention is susceptible to modification, variation and change without departing from the proper scope and fair meaning of the accompanying claims.

We claim:

1. An integrated driveline flange and torsional damper component for use on a motor vehicle having a driveshaft and a rear axle differential, the integrated driveline component comprising:
   a one-piece driveline flange for transmitting torque between a shaft flange secured to the driveline flange at a first radial location; and an input of the rear axle differential secured to the driveline flange at a second location radially spaced from the first location, the driveline flange having an outer periphery;
   an elastic component having an outer periphery, the elastic component being positioned substantially radially outwardly of the outer periphery of the driveline flange and attached directly to the outer periphery of the driveline flange; and
   a generally ring-shaped torsional damper having an inner periphery concentric with the outer periphery of the elastic component and attached to the outer periphery of the elastic component.

2. The integrated driveline component of claim 1 wherein the driveline flange is a rear axle flange.

3. The integrated driveline component of claim 1 wherein the driveline flange is generally disc shaped having a central aperture.

4. The integrated driveline component of claim 3 wherein the central aperture includes splines for driveably connecting an input shaft to the vehicle's rear axle differential.

5. The Integrated driveline component of claim 1 wherein the elastic component is a rubber ring.

6. The integrated driveline component of claim 1 wherein the torsional damper is made from a metal material.

7. The integrated driveline component of claim 6 wherein the metal material is steel.

8. The integrated driveline component of claim 1 wherein the torsional damper is generally ring shaped.

9. An integrated flange-damper component comprising:
   a generally disc-shaped one-piece rear axle flange for transmitting torque between a shaft flange secured to the rear axle flange at a first radial location and an input of a rear axle differential secured to the rear axle flange at a second location radially spaced from the first location, the rear axle flange having an outer periphery;
   a generally ring-shaped torsional damper having an inner periphery concentric with the outer periphery of the rear axle flange; and
   an elastic ring positioned radially between the outer periphery of the rear axle flange and the inner periphery of the torsional damper, wherein the elastic ring is attached directly to the outer periphery of the ear axle flange.

10. The integrated flange-damper component of claim wherein the rear axle flange defines a splined central aperture.

11. The integrated flange-damper component of claim 10 wherein the rear axle flange has a first face, a second face and includes an integra sleeve extending from the first face, wherein the integral sleeve has a splined central aperture that is aligned with the rear axle flange central aperture.

12. The integrated flange-damper component of claim 10 wherein the rear axle flange includes two other types of apertures positioned between the central apertures and the outer periphery.

13. The integrated flange-damper component of claim 12 wherein one type of aperture is circular-shaped and a second type of aperture is oval-shaped.

14. The integrated flange-damper component of claim 13 wherein there are three circular-shaped apertures and tree oval-shaped apertures.

15. The integrated flange-damper component of claim 14 wherein the three circular-shaped apertures and three oval-shaped apertures are arranged in an alternating pattern around the central aperture.

16. The Integrated flange-damper component of claim 9 wherein the torsional damper is made from a metal material.

17. The integrated flange-damper component of claim 15 wherein the metal material is steel.

* * * * *